Dec. 22, 1936. J. R. COHEN 2,065,430
OPHTHALMIC INSTRUMENT
Filed Oct. 27, 1934
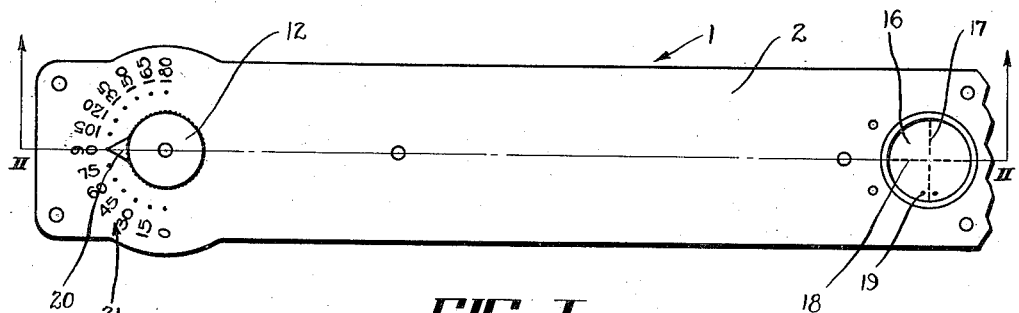
FIG. I
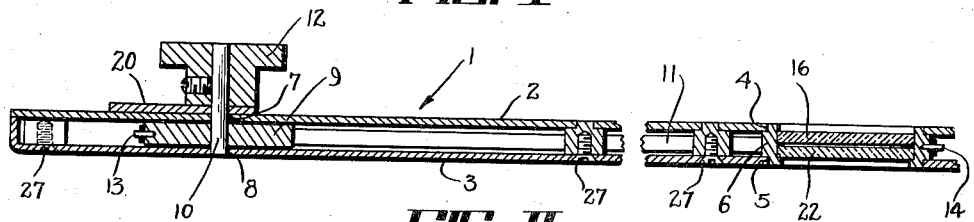
FIG. II
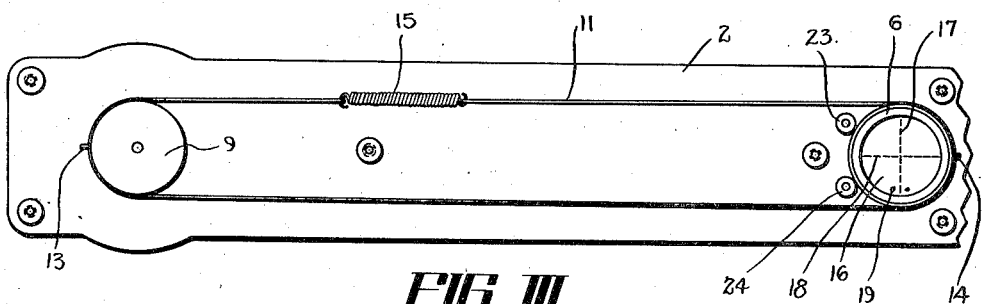
FIG. III
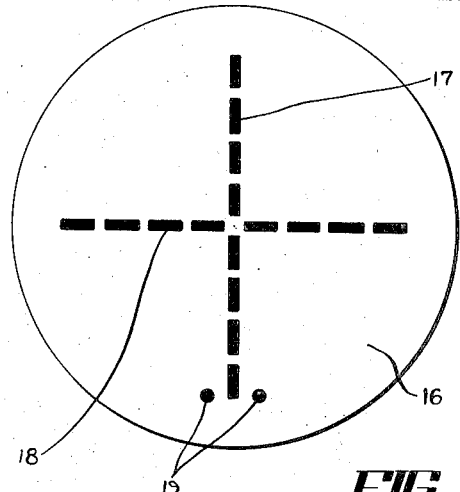
FIG. IV
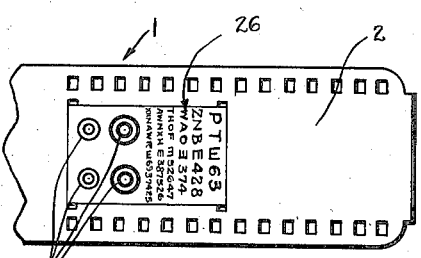
FIG. V
INVENTOR
J. Robinson Cohen
BY
Harry H. Styll
ATTORNEY Patented Dec. 22, 1936

2,065,430

UNITED STATES PATENT OFFICE 2,065,430

OPHTHALMIC INSTRUMENT

Jacob Robinson Cohen, New York, N. Y.

Application October 27, 1934, Serial No. 750,344

2 Claims. (Cl. 88—20)

This invention relates to ophthalmic instruments and has particular reference to improved means, methods and facilities for testing and determining the extent of the visual acuity of the eyes of a patient.

One of the principal objects of the invention is to provide improved means, methods and facilities for expediting the test of visual acuity and the correction of the same by the application of ophthalmic lenses so as to provide a prescription of utmost accuracy and comfort to the patient by eliminating all necessity of accommodative effort on the part of the patient during the test.

Another important object is to provide improved means and method of making quick and accurate tests for maximum vision without strain on the part of the patient by enabling the normal use of the eye under test without handicap produced by having to overcome any part of an optical error of refraction by the presence of form characters on the test means which may stimulate the function of accommodation either physically or psychologically.

Another object is to provide single test means by which the meridian of the optical error of astigmatism in an eye may be determined, and which may be used in selecting the proper corrective lens and in locating the correct meridian at which the axis of the lens is to be placed and held before the eye to produce the clearest vision with maximum comfort to the patient.

Another object is to provide test means of the above character having remote control means by which it may be rotated and remote means by which the angle of rotation of the test means may be determined.

Another object is to provide a device of the type described having test means which can be projected onto a screen.

Another object is to provide an astigmatic test chart of the above character in combination with monochromatic red to obtain clarity of vision without aid of the accommodative process of the eye under test, thus enabling a more accurate test.

Other objects and advantages of the invention will become apparent from the following description taken in conjunction with the accompanying drawing. It will be apparent that many changes may be made in the details of construction, arrangement of parts, methods and facilities shown and described without departing from the spirit of the invention as expressed in the accompanying claims, I, therefore, do not wish to be limited to the exact details and methods shown and described as the preferred form only has been shown by way of illustration.

Referring more particularly to the drawing:

Fig. I is a front view of a portion of the device embodying the invention;

Fig. II is an enlarged longitudinal sectional view taken on line II—II of Fig. I;

Fig. III is a front view of the interior of the device showing one of the side plates removed;

Fig. IV is an enlarged face view of the test means; and

Fig. V is a front view of another portion of the device, showing test means carried thereby for use in performing other visual acuity tests.

The device embodying the invention constitutes a type of projection slide adapted for use with a projection apparatus such, for example, as that disclosed in United States Letters Patent No. 1,949,067 issued February 27, 1934 to Arthur P. Wheelock and Hugo E. Tensen.

Applicant is aware of the fact that slide attachments having astigmatic test means thereon to be projected onto a screen are old in the art, and that the provision of means for rotating the projected image of the test means is old in the art, but in most instances, in the past, the test means were provided with form characters which during the test for astigmatism would stimulate the function of accommodation and introduce error in the test.

Such test means, in the past, usually had means associated with its test characters and simultaneously projected onto the screen adjacent said test characters to indicate their position of movement.

This type of position indicating means was constantly visible to the patient and was very annoying and impractical as it had a tendency to stimulate the accommodative effort of the patient and not only greatly hindered but rendered such tests inaccurate.

It, therefore, is one of the primary objects, of applicant's invention to overcome the above difficulties by providing astigmatic test means of the above character which will not stimulate the function of accommodation. Another feature is the provision of remote control means for rotating the test means and indicating the axis of rotation of the test characters on said means.

Referring more particularly to the drawing wherein like characters of reference designate like parts throughout the several views, the device embodying the invention comprises a casing 1 formed of sheet metal or other desirable opaque material having a cover portion 2 and a box like portion 3 in which the working mechanism is concealed. The portions 2 and 3 are provided adjacent one end, with aligned bearing openings 4 and 5 in which a shouldered ring 6 is rotatably mounted and, adjacent their opposite end, with aligned pivot openings 7 and 8 in which a disc member 9 is pivotally supported by a pivot pin 10.

The disc 9 and shouldered ring 6 are connected by a belt like member 11 which fits about the peripheral edges of said members.

The pivot pin 10 is provided with manually operable means 12 by which the disc 9 may be rotated, the movement of said disc being transmitted to the ring 6 through the belt 11. The belt 11 is provided with spaced openings through which suitable pin means 13 and 14 on the disc 9 and ring 6 are respectively extended to provide means for maintaining the said disc and ring in proper and permanent axial relation with each other. A spring member 15 keeps the belt taut during use.

The shouldered ring 6 is provided with test means comprising a transparent plate 16 having substantially normally related cross line test characters thereon formed of aligned spaced dashes 17 and 18. One of the lines is provided with spaced dots 19 adjacent one end thereof to provide means whereby the lines may be selectively identified.

This arrangement provides test means which may be projected onto a screen and which may be rotated by the remotely controlled manually operable means 12 to selectively locate the cross lines at different meridians throughout 180 degrees of the cycle of movement of the ring member 6. To determine the meridian at which the cross lines are rotated, the manually operable means 12 is provided with an indicator 20 registering with a degree scale or other suitable means 21 on the slide.

The ring 6 has a disc 22 of monochromatic red mounted therein in aligned relation with the means having the test characters thereon to provide means which when the test characters are projected onto a screen, will produce a red background whereby the patient's accommodation may be controlled and more clarity of vision may be obtained. In addition to aiding vision and aiding the optometrist in controlling the patient's accommodation a monochromatic background of any color will eliminate, on the patient's retina, the blur circles formed by the red, orange, green and blue rays when a test object is viewed on a white (polychromatic) background and the patient focuses, as is usual, the 555 milli micron line (yellow). These blur circles are due to the chromatic aberation of the eye.

To render the ring 6 more easily rotatable, the cover portion 2 is provided adjacent the ring with spaced rollers 23 and 24. The said rollers are adapted to engage the side of the ring which is under the tension strain of the belt 11 and provides a smooth and easy operating structure.

The slide 1 as shown in Fig. V is provided at its end opposite the manually operable means 12 with a transparent plate having test characters 25 thereon used in testing the general visual acuity of the eyes up to 20/40.

Attention is directed to the fact that there are two similar sets of test rings or characters 25 and that during the test one eye is occluded and a screen having red and green filter portions is aligned with the test characters.

One set has the red colored portion aligned therewith to produce a red background and the other set has the green colored portion aligned therewith to produce a green background. These differently colored backgrounds cause the test characters to appear as being at different focal planes or causes one of said characters to be more distinct than the other, depending of course upon the visual acuity of the eye. The correction is then altered until both sets of test characters appear to be in the same focal plane or equally distinct. The test is then repeated for the other eye.

The transparent plate is also provided with suitable test characters 26 by means of which the final maximum determination and correction with lenses may be obtained and the accuracy of said final correction may be determined.

The general visual acuity test, using the test means 25, is preferably performed prior to the astigmatic test employing test means 17 and 18. After the final correction is determined the accuracy thereof is preferably checked through the use of the test characters 26. It is to be understood, however, that the general visual acuity test and final determination of the accuracy of the correction arrived at by said tests may be performed by other means known to the art.

After the various parts of the device are assembled the box like portion 3 and cover portion 2 are secured together by screws or other suitable means 27.

Attention is directed particularly to applicant's test disc 16 and to the fact that there are no form characters on said disc which will in any way stimulate the function of accommodation either physically or psychologically during the test.

The disc is provided with remote control means so as to permit rotation thereof when it is in its position of use. The means for designating the meridian at which the test characters are rotated is separate of the test disc and is invisible to the patient.

The test utilizing the test disc 16 is substantially as follows:

The slide 1 is placed in the projection device previously referred to and the test characters on the disc 16 are projected on a screen.

One eye being occluded, the patient's attention is called to the broken line chart over which has been placed the red filter, producing broken black lines on a red background.

If the previous tests have indicated oblique astigmia, the chart is rotated so that the lines coincide with the indicated principal meridians. If not, the chart is placed so that the lines are exactly vertical and horizontal.

The patient is asked whether he sees one or two black lines. If he sees two black lines, he is asked whether they appear equally distinct and black. Regardless of his answer, plus sphere is added until he reports a blurring of the blacker line (or of both lines, if both lines originally appeared equally distinct).

If during this procedure the patient reports that the line previously blurred is now the clearer, the addition of plus sphere is continued until this second line appears slightly blurred. The correction before the eye is reduced 0.25 diopter, which should cause at least one line to be fairly clear.

If, the original position of the two lines being 90° and 180°, the patient has consistently reported both lines the same blackness, the chart is then rotated 45°. If the patient still reports both lines the same blackness there is no astigmia and this portion of the test has been completed.

In cases of myopia the patient will, of course, be unable to see either line when no correction lenses are before the eyes. In these cases, minus sphere is added until the patient can just see one of the lines. From this point, thereafter, the examination is carried on in the same manner as in simple astigmia and hyperopia.

When the patient has reported one line fairly black, and the other blurred, the patient is instructed to completely disregard the blurred line for the present and to concentrate on the clearer line. The line is then rotated about 15° to either side and back to the original position, and the patient is asked to state whether the line appeared blacker and more distinct in the first or second positions. If the patient reports no apparent difference, the line is then rotated 15° in the opposite direction and the same inquiry made. If an answer of "no difference" is again made, the patient probably has a very low astigmatic error of less than 0.50 diopter. In most cases, however, the patient will emphatically express his recognition of a difference in the blackness of the line as it is rotated.

The line is slowly rotated until the position of greatest blackness is found. Patients of even a low order of intelligence will have no difficulty in locating this position with a high degree of accuracy. It has been clinically demonstrated that patients of a high order of intelligence can consistently locate the position of greatest blackness, with an error of less than 2°.

The primary position having been obtained, minus cylinders are added with their axes at right angles to the blacker line until the lines appear equally black, and the addition of more cylinder makes the second line the blacker.

A cross cylinder of the type commonly known to the art can be used to check the astigmatic correction at this time, if desired.

This concludes the astigmatic examination of the first eye. Leave the correction in place; occlude the eye and proceed to examine the second eye in the same manner.

The above sets forth the general method of performing the astigmatic test. To use the other test means 25 or 26 it is merely necessary to align the desired chart with the light projection means of the projector. This is accomplished by moving the slide longitudinally of its holder.

From the foregoing it will be seen that simple, efficient and economical means and methods have been provided for accomplishing all of the objects and advantages of the invention.

Having described my invention I claim:

1. In a device of the character described, a relatively long and narrow slide member formed of superimposed plates having aligned openings adjacent one end thereof, a ring member rotatably mounted in alignment with the openings between the plates, a transparent plate mounted in said ring member having test characters thereon, manually operable means pivoted to said slide member adjacent its end opposite the aligned openings, means for transmitting the pivotal movement of said pivoted member to the ring member, and means associated with said pivoted member and with the slide member for indicating the extent of the movement of said pivoted member and transparent plate.

2. In a device of the character described, a relatively long and narrow support formed of superimposed plates having aligned openings adjacent one end thereof, a shouldered ring member rotatably mounted between the plates with portions thereof in said aligned openings, said ring member having a transparent disc mounted therein and a screen of monochromatic red mounted in aligned relation with said transparent disc, said disc having opaque test characters thereon, manually operable means pivoted to said support adjacent its end opposite the aligned openings, belt-like means connecting the ring member with the manually operable means for transmitting movement of said manually operable means to the ring member by substantially equal amounts, and means associated with said manually operable means and with the support for indicating the extent of movement thereof.

JACOB ROBINSON COHEN.